United States Patent [19]
Benson et al.

[11] Patent Number: 5,100,100
[45] Date of Patent: Mar. 31, 1992

[54] FLUID CONTROL AND SHUT OFF VALVE

[75] Inventors: Richard A. Benson, Bedford; Steven M. King, North Grafton, both of Mass.

[73] Assignee: MKS Instruments, Inc., Andover, Mass.

[21] Appl. No.: 581,640

[22] Filed: Sep. 12, 1990

[51] Int. Cl.$^5$ .................... F16K 31/02; G05D 7/06
[52] U.S. Cl. .................... 251/129.06; 137/486
[58] Field of Search .................... 137/486, 487.5; 251/129.06, 334

[56] References Cited

U.S. PATENT DOCUMENTS

| | | |
|---|---|---|
| 3,614,486 | 10/1971 | Smiley et al. |
| 3,851,526 | 12/1974 | Drexel |
| 4,464,932 | 8/1984 | Ewing et al. |
| 4,548,075 | 10/1985 | Marino |
| 4,695,034 | 9/1987 | Shimizu et al. |
| 4,977,916 | 12/1990 | Ohmi ........................ 137/486 X |

FOREIGN PATENT DOCUMENTS

| | | | |
|---|---|---|---|
| 2402085 | 2/1973 | Fed. Rep. of Germany | |
| 1106928 | 4/1983 | U.S.S.R. | |
| 2038451 | 7/1980 | United Kingdom | 251/334 |
| 2094940 | 2/1981 | United Kingdom | |

Primary Examiner—Alan Cohan
Attorney, Agent, or Firm—Schiller & Kusmer

[57] ABSTRACT

An improved control and shut off valve assembly is disclosed. The preferred valve assembly provides sufficient forces to overcome biasing forces so as to provide adequate shut off at a leakage rate of less than $10^{-9}$ std cc/sec of He with an atmospheric differential of Helium applied across the valve seat of the assembly, and precise control of the flow rate, all as a function of a single electrical control signal. In accordance with another aspect the valve seat is made from a material softer than the valve seat engagement means so that the seat is coined by the valve seat engagement means when first used so as to insure tight tolerances for sealing the valve passageway during the shut off mode. Finally, in accordance with yet another aspect of the invention, the valve assembly is constructed with no separate parts within the flow path so as to maintain a clean passageway.

21 Claims, 4 Drawing Sheets

FLUID CONTROL AND SHUT OFF VALVE

The present invention relates generally to an improved mass flow controller; and more particularly, to an improved fluid control and shut off valve for use in a mass flow controller in which both the flow rate and positive shut off are controlled by a single electrical control signal.

A great many processes require the careful control of the flow rate at which a fluid is introduced into each process. For example, vacuum deposition processes usually take place within a confined chamber and require the introduction of gases at carefully controlled rates over time. Accordingly, control valves connected between a source of the fluid and the process chamber have been developed which precisely and finely vary the size of an opening through a passageway through which the fluid is introduced into the process chamber as a function of the desired rate of flow. Usually these valves are used with a flow metering system which measures the actual flow rate and controls the setting of the control valve so as to maintain the actual flow rate equal to the desired flow rate.

While very accurate control valves have been developed, which when used with these flow metering systems precisely control the mass flow rate of a gas, these valves are often inadequate in providing complete shut off, particularly where certain industry standards now require positive shut off to be defined by a leakage rate of less than $10^{-9}$ std cc/sec of He with an atmospheric differential of Helium applied across the valve seat. The latter degree of shut off may be considered hermetic sealing and far exceeds the seal capability of conventional control valves and many shut off valves. For example, one type of control valve which has found some acceptance includes one or more stacks of alternating layers of metal electrode and piezoelectric materials. The stacks are used to precisely control the movement of a valve body, toward and away from a valve seat in order to control the size of a passage opening in response to and as a function of the electrical signal provided by the flow metering system. See, for example, U.S. Pat. No. 4695034 (Shimizu et al.) and the references cited therein: U.S. Pat. No. 3614486 (Smiley); German Pat. No. 2402085 (N.V. Philips); U.K. Published Application No. 2094940 (Nissan); and U.S.S.R. Pat. No. 1106928 (Zhodzishskii). However, current commercially available valves using piezoelectric stack actuators have not found use in overcoming the necessary forces to effect the positive shut off sufficient to provide $10^{-9}$ scc/sec maximum leakage while additionally generating motion sufficient to control flow rates of interest.

Accordingly, it has been customary to utilize a separate shut off valve positioned between the control valve and the process chamber to insure that no gas is introduced into the chamber when the shut off valve is closed. However, because the control valve still leaks at a higher rate than desired, gas will leak into the portion of the passageway between the control valve and shut off valve, a space referred to as "dead space". The mass disposed within this dead space, referred to as "dead volume", is usually an unknown since it will depend on the rate of seepage through the control valve, the time period the shut off valve is closed and the volume of the passageway between the control valve and shut off valve. While efforts are made to minimize the dead space, nevertheless many current processes require extremely critical start up mass flow rates. With the dead volume disposed within the dead space being an unknown, the start up flow rates also will be unknown. Accordingly, additional means must be provided for expelling the dead volume from the dead space just prior to the initiation of a control cycle, in order to achieve sharp and repeatable transitions from zero flow to the control point.

Efforts have been made to integrate the control and shut off valve as a single unit so as to eliminate the dead volume by obtaining the requisite leak tightness at the control valve seat location. Such a valve is shown and described in, copending U.S. Pat. application No. 07/498,006, (now U.S. Pat. No. 5,040,559, issued Aug. 20, 1991, which is a continuation of U.S. Pat. application No. 307,676 filed Feb. 6, 1989 (now abandoned) in the name of James H. Ewing and assigned to the present assignee (hereinafter the "Copending Application"). The valve described in the Copending Application utilizes an electrically driven solenoid mechanism to provide force between the valve body and valve seat for the control function, and a pneumatic and hydraulic system to provide a force between the valve body and valve seat for the shut off function. While this valve provides substantial advantages over the prior art, it may be desirable under some circumstances to provide both the control and shut off functions with the same electrical control signal so as to eliminate the need for auxiliary pnuematics or hydraulics.

Accordingly, it is a general object of the present invention to substantially reduce or overcome the above noted problems.

Another, more specific object of the present invention is to provide a control and shut off valve assembly responsive to the same electrical control signal for both the control and shut off functions.

A further object of the present invention is to provide an improved mass flow controller including a control and shut off valve having no dead space between the control point and shut off point.

Yet another object of the present invention is to minimize the dead space between the control and shut off point of a control and shut off valve and the outlet of the valve.

Still another object of the present invention is to provide an improved mass flow controller including a control and shut off valve providing accurate control and shut off functions.

And yet another object of the present invention is to provide an improved control and shut off valve actuator assembly capable of operating electrically without auxiliary hydraulics or pneumatics.

And another object of the present invention is to provide an improved control and shut off valve actuator assembly capable of generating the high level of force required for sealing during the shut off function, and the exceptional resolution of motion required for fine control during the control function, all in response to the same electrical control signal.

And yet another object of the present invention is to provide an improved control and shut off valve actuator assembly including an adjustment mechanism for precisely positioning the valve actuating column to achieve the desired position sealing.

And still another object of the present invention is to provide an improved control and shut off valve assembly having all metal parts exposed to the fluid passing through the assembly, and capable of forming its own valve seat so as to insure a positive seal when the valve assembly is shut off to satisfy industry standards for leakage requirements of less than $10^{-9}$ std cc/sec of He.

And yet another object of the present invention is to provide an improved control and shut off valve which is relatively compact, reliable, inexpensive to manufacture, as well as operates at relatively low power consumption levels.

In addition, the use of separate elements (such as the bellows in the device described in the Co-pending Application and the force transmitting member, seating member and/or bias spring of devices described in U.S. Pat. No. 4,695,034) which form a part of the valve actuator mechanism and are disposed within the flow path can produce minute particles which can be picked up and carried by the fluid flowing through the flow passageway of the valve.

Accordingly, another object of the present invention is to provide a control and shut off valve comprising no separate parts disposed in the flow path of the valve body so that clean, fully swept, minimum length passageways can be provided between the flow sensor and control valve seat for rapid response at low flows and minimum flow stagnation.

We believe that the reason the type of valve shown in U.S. Pat. No. 4,695,034 is incapable of providing sufficient force to provide positive shut-off is due to the requirement of motion amplication which correspondingly increases force requirements and necessitates larger actuators which must also supply energy to deal with the compliances along the force transmitting path.

Accordingly, another specific object of the present invention is to provide an improved control and shut off valve including an actuator in which the number of interfacing surfaces along the force transmitting path are reduced in order to reduce the amount of backlash and increase the amount of available force so as to achieve positive shut off.

These and other objects of the present invention are achieved by an improved fluid control and shut off valve assembly.

The preferred valve assembly uses a piezoelectric or electrostrictive stack actuator to provide a sufficient force to overcome biasing forces so as to effect adequate shut off at a leakage rate of less than $10^{-9}$ std cc/sec. of He with an atmospheric differential of Helium across the valve seat of the assembly, and precise control of the flow rate, all as a function of a single electrical control signal. In accordance with another aspect of the invention, a diaphragm member includes means directly cooperative with the valve seat so that all of the parts of the valve actuator are disposed on the side of a flexible diaphragm member opposite the flow path. And in accordance with another aspect the valve seat is made of a material softer than the portion of the valve body engaging the seat so that the seat is coined by the valve seat engagement portion when first used so as to insure tight tolerances for sealing the valve passageway during the shut off mode.

Other objects of the present invention will in part be more evident and will in part appear hereinafter. The invention accordingly comprises the apparatus possessing the construction, combination of elements, and arrangement of parts exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
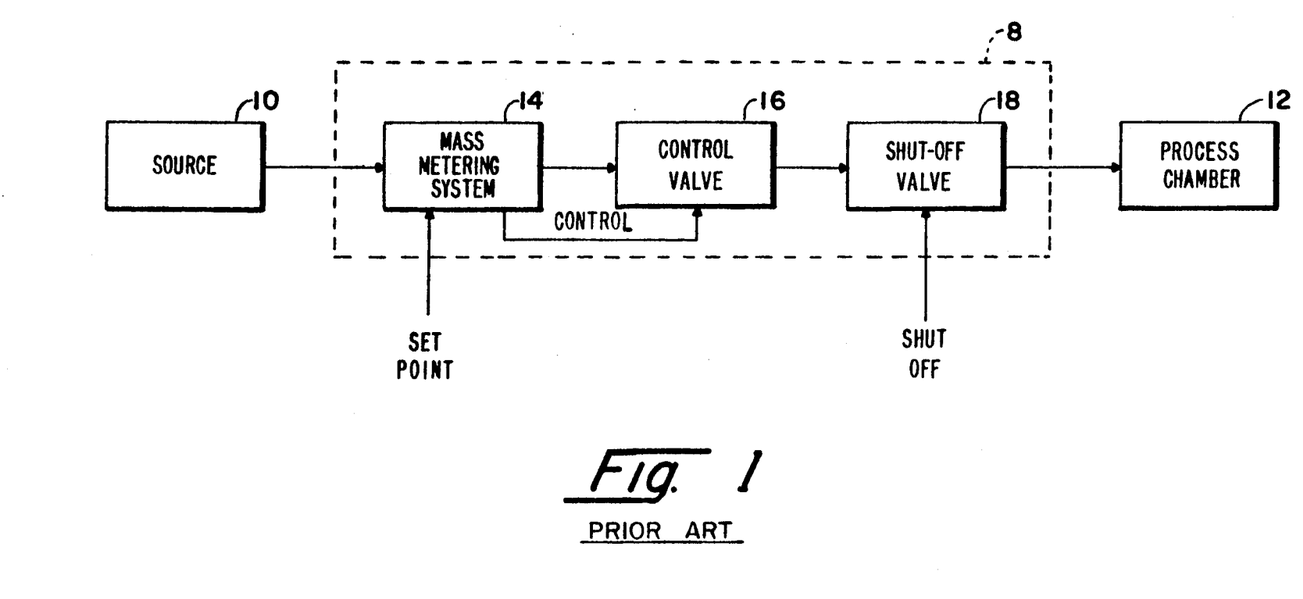
FIG. 1 shows a block diagram of the prior art arrangement of a combined flow metering system, control valve and shut off valve.

Referring to FIG. 1, the prior art system 8 controls the flow of fluid through the system from a source 10 of fluid to the process chamber 12. The fluid may be provided from any source and may pass through a shut off valve associated with the source and filtered to insure that particulate matter above a certain predetermined size does not enter the chamber, before it is introduced into the mass metering system 14. The latter is used to control the position of the control valve 16 connected to the fluid output of the mass metering system. A specific mass metering system 14 is described hereinafter in connection with FIG. 2. Since the typical control valve 16 of the prior art, such as the ones described in U.S. Pat. No. 4,695,034, is inadequate in providing complete shut off so as to prevent leakage of fluid from the source 10 to the chamber 12, a separate shut off valve 18 is provided downstream from control valve 16. While control valves have been developed which provide accurate control of the mass flow from source 10 to chamber 12, most are inadequate when complete shut off is desired, i.e., the control valve is incapable of providing hermetic sealing where, for example, any leakage through the valve is below the predetermined maximum permissible level of the industry standard noted above. Accordingly, a separate shut off valve 8, responsive to a separate shut off control signal, is provided downstream from control valve 16.

Valve 18 is usually constructed to provide greater sealing of the passageway than can be provided by the control valve. Unfortunately, with such an arrangement the control valve 16 will still leak gas into the space of the passageway between the control and shut off valves so as to create a dead volume within the dead space. The actual mass of the gas disposed within the dead space is an unknown since there are many variables which determine its size. For example, one factor is the rate of leakage of the control valve 16, which in turn is determined by the mechanical forces available to close the control valve, the mechanical tolerances of the parts used to construct the control valve, the differential pressure across the valve seat of the control valve, etc. Other factors include the area of the passageway surfaces between the control and shut off valves, which may act as sources of outgassing, and the length of time the shut off valve is turned off. The problem created by the dead volume is that as the shut off valve is open, any unknown mass of gas within the dead space enters the process chamber 12 and affects critical operating conditions within the chamber.

Accordingly, as evidenced by the Copending Application, efforts have been made to integrate the control and shut off valves into one valve structure, i.e., a valve which can provide the precision positioning for flow control, while additionally providing the large forces and minimum mechanical tolerances required for complete shut off. The integrated valve structure described in the Copending Application utilizes pneumatic and hydraulic forces to provide complete shut off. However, in some instances, it is desirable to provide both control and shut off functions with a single electrical control signal, without the need for separate hydraulic and pneumatic auxiliary sources.

In accordance with the present invention therefore, an integrated control and shut off valve is provided in which both the control and shut off functions are obtained solely by electrical control signals.

More specifically, referring to FIGS. 2-7, a mass flow controller 30 constructed in accordance with the present invention includes a mass metering system 14, and a new and improved control valve actuator assembly 32, responsive to a control signal provided by the system 14.

Figure 2:
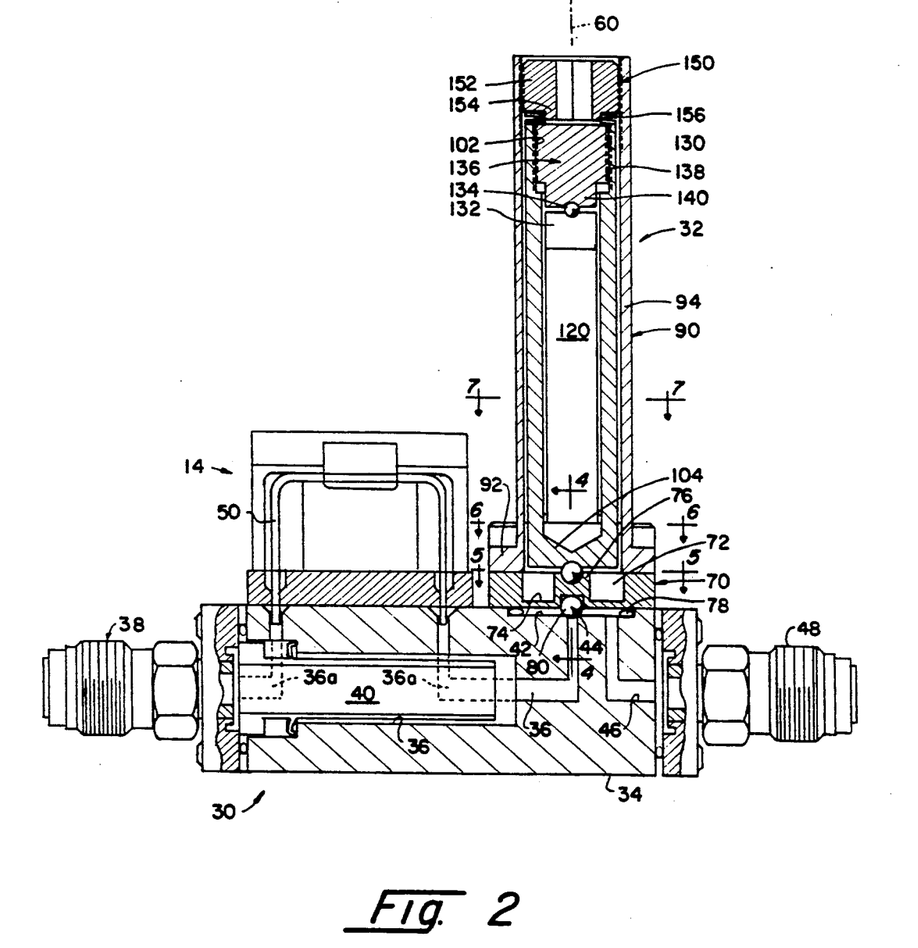
FIG. 2 shows a cross section of the preferred embodiment of the mass flow controller including a normally closed valve control and shut off assembly.
Figure 4:
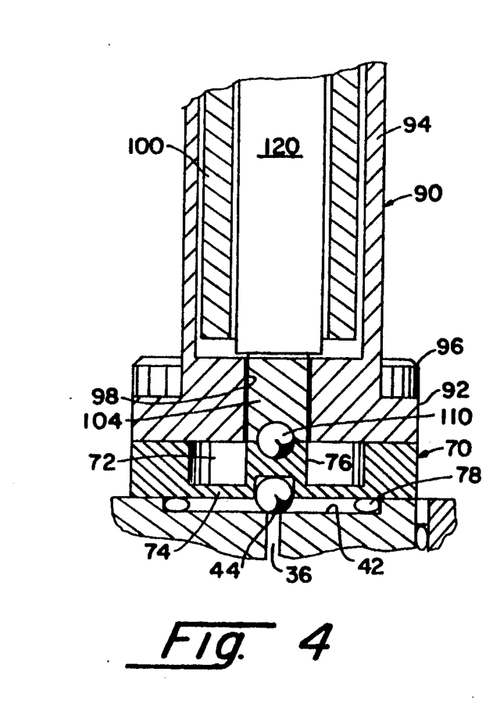
FIG. 4 is a cross-sectional view, partially cut-away, taken along section line 4—4 in FIG. 2.

The controller 30 includes a flow body 34, preferably formed as a block. In the embodiment shown, the body 34 includes (1) a first passageway 36 defining at one end in a side of the body an inlet for connection with the inlet assembly 38, (2) a section, if necessary, defining a by-pass section for receiving the by-pass assembly 40, and (3) an outlet on the top of the body, where the top surface of the latter is formed with a recess 42 (as best shown in FIG. 4) for defining with the passageway the valve seat 44. A second passageway 46 is provided in the body 34 having one end communicating with the recess 42 on the top of the body 34, and its opposite end extending to the side of the body opposite the inlet assembly 38, where it is connected with the outlet assembly 48.

The mass metering system 14 includes a capillary tube 50 coupled to the by-pass section of passageway 36. Tube 50 is designed to pass all the mass introduced at the inlet of the capillary tube up to its design maximum, with the remainder of the mass, if any, flowing through the by-pass assembly 40. In a typical mass metering system, sensors are used with the capillary tube for detecting temperature change in the fluid as a function of mass flow through the capillary tube 50 (and thus the entire control valve) and for providing an electrical output signal as a function of the detected mass flow. See, for example, U.S. Pat. No. 3,851,526 (Drexel); U.S. Pat. No. 4,464,932 (Ewing et al.) and U.S. Pat. No. 4,548,075 (Mariano) and copending application, U.S. Ser. No. 581,285 filed in the name of Charles Mariano and assigned to the present assignee (hereinafter the "Mariano Application"). The preferred mass metering system used in the present mass flow controller is the latter one described in the Mariano Application. The output signal of the sensors is processed through a controller (not shown) forming a part of the mass metering system 14 so as to provide a control signal applied to the control valve 32. This control signal is a function of the actual mass flow through the capillary tube and a preselected mass flow represented by a set point signal provided by the operator of the system, and is used to control the opening of the passageway through the control valve in order to bring the actual flow rate through the control valve to the preset value determined by the set point preselected by the operator. It should be appreciated that the by-pass assembly is not needed for relatively low ranges of flow rates, e.g., less than or equal to 50 sccm (FS), in which case the by-pass section of passageway 36 between the inlet and outlet of the capillary tube 50 can be completely sealed from the mass flow so that all flow occurs through the capillary tube, as indicated by the dotted lines 36a.

Figures 3, 5, 6, 7:
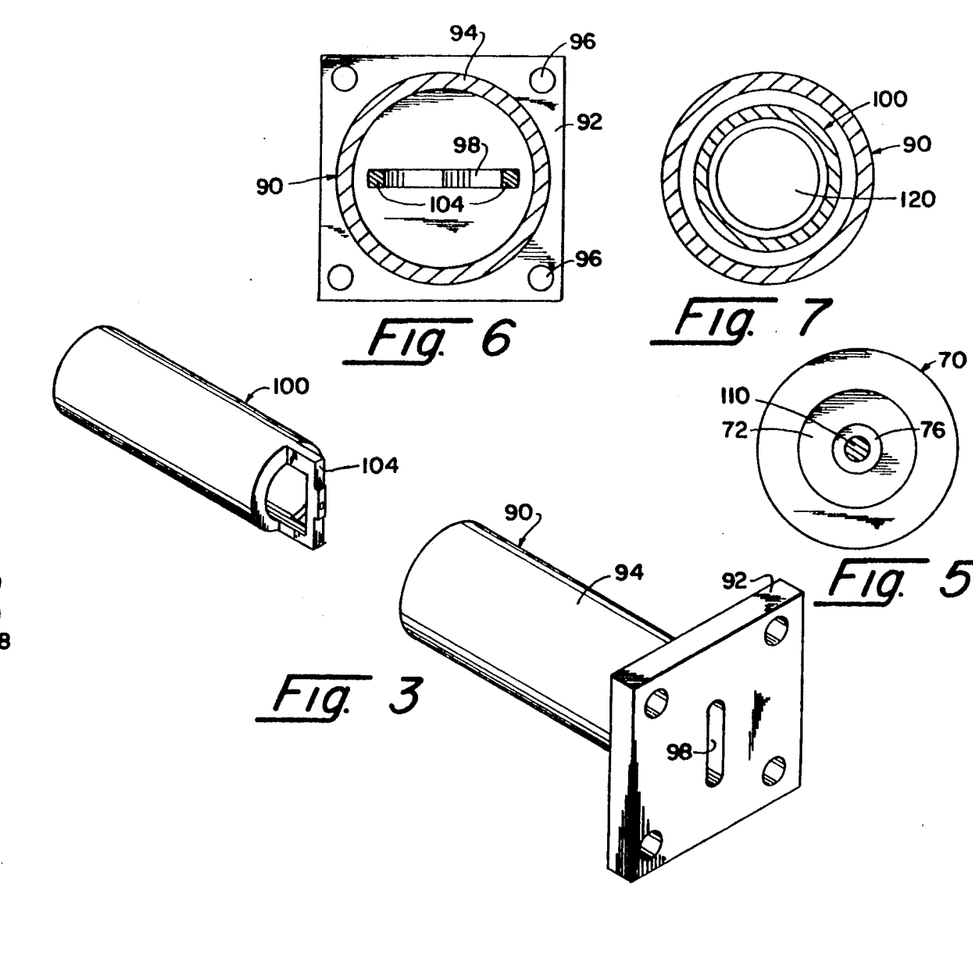
FIG. 3 is an exploded perspective view of the actuator yoke and housing assembly.
FIG. 5 is a cross-sectional view taken along section line 5—5 in FIG. 2.
FIG. 6 is a cross-sectional view taken along section line 6—6 in FIG. 2.
FIG. 7 is an enlarged cross section of the portion of the FIG. 2 assembly including the valve body and valve seat.

In addition to the valve body 34, the control valve includes an improved control valve actuator assembly 32 for applying a force along the force transmitting axis 60 which extends through the center of the valve seat 44. The valve control actuator assembly 32 includes an isolating diaphragm member 70. The latter includes means (in the form of spherical ball 80), directly fixed to the member (so that the center of the ball lies on the axis 60), for directly engaging the valve seat 44 so that all of the remaining parts of the actuator are positioned on the opposite side of the diaphragm member 70 from the flow path of fluid defined by the passageway 36, recess 42 and passageway 46, with no separate parts being disposed in the flow path. In addition, the isolating diaphragm member 70 is used to secure the remaining portion of the actuator assembly to the valve body 34. As seen in FIG. 2 and 5, the diaphragm member is provided with an annular groove 72 so as to form a resilient annular diaphragm 74 and the center post 76. The elongated axis of the post is aligned with the force transmitter axis 60. The end of post 76 is provided with a recess for receiving the spherical ball 110, described hereinafter. The member 70 is secured to the top of the body 34 so that it completely covers the recess 42. A C-ring seal 78, preferably made of metal, is used to pressure seal the diaphragm plate over the recess so that mass flow will flow from the passageway 36, through the space defined by the recess and diaphragm member 70 into the passageway 46 with no leakage between the member 70 and the body 34. The member is preferably mounted so that the groove 72 and post 76 are both disposed on the upper side of the member and the relatively flat side of the member is disposed as the bottom of the member so that the space formed within the recess 42 and the member is of a minimum volume so as to further reduce dead space between the valve seat and the outlet assembly 48.

Preferably, the spherical ball 80 is force fit into the bottom surface of the diaphragm member. The annular diaphragm 74 is made sufficiently thin, and therefore compliant, so as to allow the ball 80 to move the required amount along the axis 60 so that the valve can be opened to some maximum flow rate, as will become more evident hereinafter. In the preferred embodiment the maximum allowable deflection between the ball 80 and the seat 44 is about 1.5 mils, although this can vary depending on the maximum flow desired.

Preferably, in accordance with one aspect of the present invention, at least the portion of the body 34 forming the seat 44 at the opening of the passageway 36 into the recess 42 is made of a softer material than the material of ball 80 so that as force is initially applied by the ball 80, forcing the latter against the circular edge formed by the intersection of the passageway 36 and the surface of the recess, the ball coins the seat within extremely accurate tolerances. For example, the ball 80 can be made of a relatively hard corrosion resistant material such as martensitic stainless steel or other similar metal or metal alloy, while the valve seat can be made of a relatively softer corrosion resistant material, such as austenitic stainless steel. The force exerted on the ball 80 when the valve is closed must therefore be high enough for hermetic sealing at or below the standard leakage rate, but not so high that significant deflection is present in the valve seat or that the flow of seat metal is excessive.

As shown, the valve assembly shown in FIGS. 2-7 is a normally closed valve, meaning that in the absence of a control signal the valve is in the shut off mode with the actuator assembly 32 providing a sufficient loading force to move the spherical ball 80 into the seat 44 so as to provide positive shut off. As best seen in FIGS. 2-7, in order to open the valve, in the control mode, the actuator assembly is constructed to provide a counter force opposite the loading force so as to relax the annular diaphragm 74 so as to allow the ball 80 to move away from the seat. The actual amount of deflection movement of the ball relative to the seat along axis 60 will be dependent upon the signal output of the metering system 14, which in turn is a function of the desired flow rate through the passageways 36 and 46.

Describing the actuator assembly 32 in greater detail, as best seen in FIGS. 4 and 6, the latter includes a housing 90 comprising a base 92 supporting a cylindrical section 94. The base extends radially at the lower end of the cylindrical section so as to form an external base flange for accommodating mounting screws 96. The latter secure the housing 90 on the diaphragm member 70, and both in their proper place to the top of the valve body 34. As best seen in FIGS. 3, 4, and 6, an internal slot 98 is formed in the housing base diametrically relative to the axis 60, preferably the length of the internal diameter of the cylindrical section 94. The housing 90 is open at its top end for receiving the various actuator components, described hereinafter.

The various components disposed within the housing include an actuator yoke 100 comprising a hollow tube formed with a counter bore 102 at its top end as seen in FIG. 2. The lower end of the actuator yoke includes a tongue 104, preferably U-shaped and attached at each end to opposite sides of the bottom of the yoke. The tongue 104 is sized so as to fit within slot 98 of the base 92 of the housing 90 so that the yoke is prevented from rotating about the axis 60 relative to the housing 90, and at the same time free to move longitudinally along the axis 60.

Means, preferably in the form of a second spherical ball 110, is provided to couple the end of the tongue 104 to the top of the post 76. The ball is preferably force fit into the surface of either the top of the post or the bottom of the tongue and is positioned so that the center of the ball is disposed on the axis 60.

As previously described the valve shown in FIGS. 2-7 is a normally closed valve. As described hereinafter, biasing forces are provided to maintain the ball 80 in seat 44 sufficient to provide positive shut off at the minimum leakage rate described above. Accordingly, the valve actuator assembly 32 also includes means, in the form of an electromechanical force generating device 120, responsive to a single electrical control signal provided from the mass metering system 14, for moving the ball 80 away from the seat 44 (against the biasing forces) in a fine degree so that the flow rate through the valve can be accurately controlled from zero flow at positive shut off to some finite maximum limit. The electromechanical force generating device 120 preferably comprises at least one stack of alternating layers of piezoelectric (or electrostrictive) and electrode materials. Electrostrictive and piezoelectric materials are well known and their use in actuators are now becoming commercially available. For example, electrostrictive compositions including lead magnesium niobate ($Pb_3MgNb_2O_9$) and other relaxor ferroelectrics, have been successfully used as transducer materials, and have potential advantages as well as disadvantages over piezoelectric materials. See, for example, Cross, et al., "Large Electrostrictive Effects in Relaxor Ferroelectrics", *Ferroelectrics*, Vol. 33, pp. 187-192, 1980 (wherein a composition of $Pb_3MgNb_2O_9$-$PbTiO_3$ is described); Uchino, "Electrostrictive Actuators: Materials and Applications", *Ceramic Bulletin*, Vol. 65, No. 4, pp. 647-652 (1986); as well as product description of the AVX Electrostrictive Actuators from the AVX Corporation of Myrtle Beach, SC. Electrostrictive devices provide relatively greater force densities than the equivalent piezoelectric devices, although the valve shown in FIG. 1, includes relatively few interfacing surfaces so that sufficient forces from piezoelectric stack actuators can be obtained. Piezoelectric materials tend to be less stiff and may be of somewhat larger size to do the necessary work to overcome the shut off biasing forces and provide acceptable motion for flow control.

As shown best in FIG. 2, device 120 preferably includes at least two commercially available stacks, placed end to end, so as to provide the required amount of displacement to the post 76 of the diaphragm plate 70 so as to provide the necessary movement of the ball 80 from the seat 44. The stacks are disposed between the top surface of the base 92 of the housing 90 (covering the slot 98 and thus the tongue 106 disposed therein) as seen in FIG. 4, and the ball and nut assembly 130 as seen in FIG. 2. The latter is provided for providing a loading force on the stack actuators between the top surface of the base 92 of the housing 90 and the ball and nut assembly 130.

The assembly 130 includes a load plate 132 having a center seat for receiving the spherical ball 134. Assembly 130 also includes adjustment nut 136 having a screw threaded head 138 adapted to rotate in the counter bore portion 102 of the housing 90. Nut 136 also includes a post 140 of smaller outer diameter than the internal diameter of the actuator yoke 100 so that as the nut 136 is rotated in the counter bore portion of the housing, the post moves along the axis 60. The end of the post 140 is provided with a seat 142 for receiving the spherical ball 134.

A second adjustment nut 150 includes a screw threaded head 152 adapted to rotate in the upper end of the housing 90. Nut 150 also is provided with a post 154 spaced from the top of the head 138 of the nut 136. The nut includes suitable means such as a hollow cylindrical hole of a hexagonal or square cross section so that a tool, such as an Allen wrench, can be used to turn the nut within the housing. A pair of conical washers, forming Bellville spring 156, are provided between the head 152 and the top of the actuator yoke 100 so that as the nut 150 is tightened, the spring 156 is biased against the top of the yoke downwardly, forcing the deflection of the diaphragm plate down so that the ball 80 engages the seat 44. Sufficient biasing force is provided by the spring 156 to load the spring formed by diaphragm 74 and provide positive shutoff.

The stack actuators forming device 120 push against the top surface of the base 92 of the housing 90 so as to move the top ball assembly 130 and the actuator yoke 100 relative to the housing against the bias of the spring 156 so that the annular diaphragm 74 relaxes allowing the ball 80 to separate from the seat 44 by an amount equal to the amount of deflection provided by the actuators, which in turn is determined by the amount of voltage provided across the stack actuators.

More specifically, the ball 80 will deflect along the axis 60 by an amount depending upon the differential voltage provided across adjacent electrodes positioned between adjacent layers of electrostrictive or piezoelectric material. The voltage is applied from the controller of metering system 14 over wires (not shown) connected to the electrodes of the stacks in a well known manner.

It should be appreciated that the adjustment nut 136 is used to preload the actuator stacks forming the device 120 with a compression force sufficient to take up any slack in intracomponent surfaces and in the layers of materials of the actuator stacks so as to establish the zero volt position (when complete shut off is desired) and yet insure movement of the post 76, and therefore movement of the ball 80 with a minimum applied voltage on the wires to allow the post 76 of the diaphragm member 70 to move against the force provided by the Bellville spring. In addition, the spherical balls 110 and 134 allow for any uneven off axis deflection of the stack actuators.

The yoke 100 are each preferably made of a material having the same or similar coefficient of thermal expansion as the actuator device 120. Electrostrictive stacks of the type described above, for example, provide a relatively low linear coefficient of thermal expansion, e.g., 1 ppm/C°. One metal alloy material which matches this linear coefficient of thermal expansion is Invar (36FM).

It should be apparent from the foregoing that the force generating device 120 must provide sufficient force to overcome the force exerted by the single spring 156, while being aided by the preloaded forces on the spring of the diaphragm 74. The preferred spring 156 exerts a seating force of about 75 pounds, although this can clearly vary depending upon the particular application.

Figure 8:
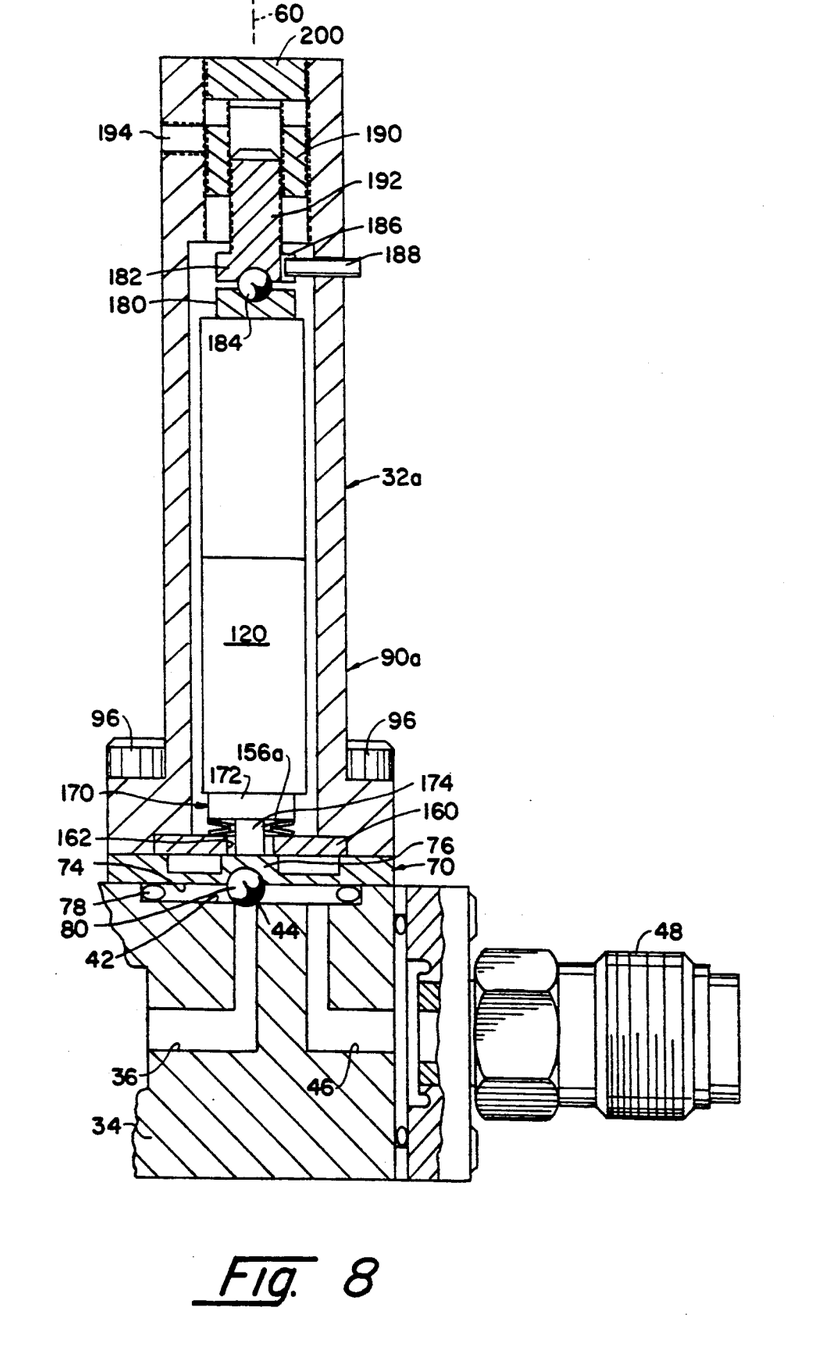
FIG. 8 shows a cross-section of the preferred embodiment of the normally opened control and shut off valve constructed in accordance with the principles of the present invention.

It should be noted that a normally closed control and shut off valve assembly is shown in and described with respect to FIGS. 2-7. It should be appreciated that the principles of the present invention can be easily applied to a normally open control valve actuator assembly 32a, as shown in FIG. 8. As shown, the valve body 34 is identical to the valve body shown in FIG. 1, with the assembly 32a being responsive to a mass metering system 14 similar to that shown in FIG. 1, except that in the absence of a control signal the valve is normally open, and when the maximum signal is applied the valve is positively shut off at the minimum prescribed leakage rate. In the embodiment shown the diaphragm member 70, including the spherical ball 80 is also used, with the ball 80 engaging the seat 44 when positive shutoff is determined by the level of the control signal. The actuator yoke 100 has been omitted and the housing 90a is modified so that the bottom of the cylindrical section is completely open, and in fact cooperates with the top of the diaphragm plate to form a recess so as to accommodate the spring plate 160 adapted to completely cover the groove 72 and post 76 of the member 70. The spring plate 160 is provided with an aperture 162 coaxial with the force transmitting axis 60. The top of the plate is provided with an annular recess, coaxial with the axis 60 for accommodating a pair of conical washers forming Bellville spring 156a.

An actuator adapter 170 is provided for transmitting force from the device 120 to the spherical ball 80 along the axis 60. The actuator adapter includes a head 172 and a button 174 with the head disposed between the the device 120 and the spring 156a, and the post extending through the spring and the aperture 162 and engages the top of the post 76 of the diaphragm plate 70. In this regard the button 174 of the adapter is sufficiently long so that the button is capable of longitudinal movement within the aperture 162 for moving the center of the diaphragm plate, and thus the ball 80, the total amount of deflection from a fully opened position (with no deflection) to positive shutoff (with maximum deflection) while compressing the spring 156a in the process.

An upper ball and nut assembly 130a is provided at the top end of the device 120. Assembly 130a includes lower and upper plates 180 and 182, each formed with a spherical or substantially spherical seat for receiving the ball 184 having its center positioned on the axis 60. The plates 180 and 182 and the ball 184 form a ball joint for allowing for any uneven off axis deflection of the stack actuators forming device 120. The upper plate 182 is provided with a slot 186 for receiving a pin 188 extending through the hole 190 in the side of the housing 90a into the slot so as to insure any movement of the plate 182 is always in the direction of the axis 60 and that the plate will be prevented from rotating about the axis.

In order to provide fine movement of the stack along the axis 60 so as to insure that the button 174 can be moved with precision into contact with the center of the post 76 of the diaphragm plate 70, the inner cylindrical wall portion at the upper end of the housing 90a is threaded with a first thread gauge for receiving the nut 190. The outer surface of the nut 190 is threaded with the same thread gauge as the inner cylindrical wall of housing 90a so that the nut can be freely moved axially along the axis 60. The inner surface of the nut 190 is provided with a second thread gauge so as to receive the stud 192. The latter is provided with threads on its outer cylindrical surface and can be moved in an axial direction along the axis 60 by rotating the stud relative to the nut, or rotating the nut and stud relative to the housing. The second thread gauge is slightly different from the first thread gauge. In the preferred embodiment, the first thread gauge is 56 threads/inch, while the second thread gauge is 52 threads/inch. This will insure extremely fine adjustment of the relative position of the button 174 to the center of the post 76 of the diaphragm member 70. Adjustment can be monitored by a mass spectrometer at the outlet assembly 48 to determine the exact position of the button when the valve begins to leak with full sealing voltage applied, the rotation of the nut and stud can then be reversed slightly until the leak is below the predetermined maximum level so as to establish the closed position. A locking screw 194 is provided to lock the nut 190 in place once the zero position is determined. Finally, a cover 200 can be used to cover the nut 190. Both nut 190 and cover 200 can be provided with suitable means, such as holes (not shown) so that the two elements can be rotated relative to the housing 90a with, for example, a spanner wrench or similar tool.

The control and shut off valve assemblies 32 and 32a of both the open and closed design are responsive to the same electrical command signal for both the control and shut off functions, and therefore do not rely on nor require auxiliary hydraulic and pneumatic sources. Since the valve assembly is capable of providing relatively large seating forces capable of achieving hermetic sealing when shut off, both the control and shut off functions are controlled at the ball and seat so that there is no dead space between the control point and shut off point. The shut off valve 18 of the prior art arrangement can be omitted, although the user may still wish to use shut off valves upstream and downstream of the flow controller 30 in order to permit easy installation and replacement of the flow controller. The use of electrostrictive or piezoelectric stack actuators allow for accurate control and shut off functions, and yet generate the high level of force required for sealing during the shut off function, and the exceptional resolution of motion required for fine control during the control function, all in response to the same electrical control signal. The adjustment nut 150 shown in FIG. 2 and the differential nut assembly shown in FIG. 8 provide an adjustment mechanism for precisely positioning the valve actuating column to achieve the desired position sealing between the ball 80 and seat 44. The control and shut off valve assembly easily can be made of all metal parts exposed to the fluid passing through the assembly, and is capable of forming its own valve seat so as to insure a positive seal when the valve assembly is shut off to satisfy industry standards for leakage requirements of less than $10^{-9}$ std cc/sec of He. Finally, the control and shut off valve assembly is relatively compact, reliable, inexpensive to manufacture, as well as operates at relatively low power consumption levels.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A fluid control system and shut off valve assembly comprising:
    a body having an inlet, an outlet, and a fluid passageway connecting the inlet and outlet; and
    a single valve disposed in said housing and including a valve body and a valve seat movable relative to one another so as to define the size of an opening through the passageway; means, including at least a stack of laminated layers of material adapted to deflect along an axis normal to said layers responsively to an electrical control signal, for moving said valve body and valve seat relative to one another in response to said electrical control signal, and means for allowing for any uneven off axis deflection of said stack;
    wherein (1) the flow rate of fluid through the passageway between the inlet and outlet, and (2) complete shut off of the valve, such that any leak through the valve is at a rate less than $10^{-9}$ std cc/sec. of Helium, are controlled by and are a function of said electrical control signal.

2. A mass flow controller including a valve assembly of claim 1, and further comprising a mass metering system for measuring the rate of flow of fluid through said passageway and means for generating said control signal as a function of said control signal.

3. A fluid control and shut off valve assembly comprising:
    a body having an inlet, an outlet, and a fluid passageway connecting the inlet and outlet; and
    a single valve, disposed in the housing and including a stack actuator comprising a plurality of laminated layers of material adapted to deflect along an axis normal to said layers responsively to an electrical control signal, for (1) controlling the flow rate of fluid through the passageway between the inlet and outlet, and (2) shutting the valve off sufficiently so that nay leak through the valve between the inlet and outlet is at a rate less than a maximum leakage of $10^{-9}$ std cc/sec of Helium, all in responsive to and as a function of said control signal, said valve further including means for allowing for any uneven off axis deflection of said laminated layers.

4. The fluid control and shut off valve assembly according to claim 3, wherein said stack actuator comprises a plurality of laminated layers of electrostrictive material.

5. The fluid control and shut off valve assembly according to claim 3, wherein said stack actuator comprises a plurality of laminated layers of piezoelectric material.

6. The fluid control and shut off valve assembly according to claim 3, wherein said valve further includes (a) a valve seat defining a part of said passageway, and (b) diaphragm means cooperative with said stack actuator and including a sealed diaphragm disposed between said stack actuator and the body for sealing the stack actuator from the passageway and for transmitting the deflection and force from the stack actuator to the body in response to and as a function of the control signal.

7. The fluid control and shut off valve assembly according to claim 6, wherein said diaphragm means includes valve seat engagement means fixed to said diaphragm and movable relative to the valve seat in response to said control signal so that said valve seat engagement means is movable between a first position wherein said valve seat engagement means is in contact with said seat and a second position wherein said valve seat engagement means is spaced from said valve seat so as to vary the size of an opening in said passageway.

8. The fluid control and shut off valve assembly according to claim 7, wherein said valve further includes force transmission means coupled between said stack and said diaphragm means for transmitting force provided by said stack to said diaphragm so as to move said valve seat engagement means.

9. The fluid control and shut off valve assembly according to claim 8, wherein said valve is shut off in the absence of said control signal and said force transmission means includes (a) yoke means mechanically coupled between said stack and said diaphragm, and (b) biasing means for biasing said yoke means into said diaphragm so that said valve seat engagement means engages said valve seat so as to achieve shutoff in the absence of said control signal.

10. The fluid control and shut off valve assembly according to claim 9, wherein said stack actuator moves said yoke against said biasing means so as to move said valve seat engagement means relative to said seat as a function of said control signal.

11. The fluid control and shut off valve assembly according to claim 10, wherein said diaphragm means includes a post mechanically coupling said yoke to said diaphragm.

12. The fluid control and shut off valve assembly according to claim 11, wherein said valve seat engagement means includes a spherical ball fixed to said diaphragm means for engaging said valve seat.

13. The fluid control and shut off valve assembly according to claim 9, further including second biasing means for biasing said plurality of laminated layers together so that the stack actuator deflects said valve seat engagement means away from said valve seat substantially zero offset.

14. The fluid control and shut off valve assembly according to claim 13, further including fine adjustment means for moving said stack actuator against said second means for biasing so that said stack actuator is physically positioned to move said valve seat engagement means relative to said valve seat as a function of said control signal with substantially zero offset.

15. The fluid control and shut off valve assembly according to claim 7, wherein said diaphragm has a predetermined compliance, and said stack actuator provides sufficient force to counter said compliance and said first and second means for biasing so as to provide, said control of said flow rate.

16. The fluid and shut off valve assembly according to claim 9, wherein said valve is fully open in the absence of said control signal and said valve further includes an adapter cooperative with said stack actuator and movable toward said diaphragm means in response to and as a function of said control system.

17. The fluid control and shut off valve assembly according to claim 16, further including first means for biasing said adapter and stack actuator away from said diaphragm means.

18. The fluid control and shut off valve assembly according to claim 17, further including second means for biasing said plurality of laminated layers together so that the stack deflects said adapter toward said valve seat as a function of said control signal with substantially zero offset.

19. The fluid control and shut off valve assembly according to claim 18, further including fine adjustment means for moving said stack actuator against said second means for biasing so that said stack is physically positioned to move said diaphragm as a function of said control signal with substantially zero offset.

20. The fluid control and shut off valve assembly according to claim 19, wherein said diaphragm has a predetermined compliance, and said stack actuator provides sufficient force to counter said compliance and said first and second means for biasing so as to provide said control of said flow rate.

21. A fluid control and shut off valve assembly according to claim 6, wherein said valve seat is made of a softer material than said valve seat engagement means so that said valve seat engagement means coins said seat when said valve seat engagement means engages said seat so as to shut off said valve sufficiently so that any leak through the valve between the inlet and outlet is less than said maximum leakage.

* * * * *

UNITED STATES PATENT AND TRADEMARK OFFICE
CERTIFICATE OF CORRECTION

PATENT NO. : 5,100,100

DATED : March 31, 1992

INVENTOR(S) : Richard A. Benson, et al.

It is certified that error appears in the above-identified patent and that said Letters Patent is hereby corrected as shown below:

Claim 2, column 11, line 67, delete "a" (second occurrence) and substitute therefor -- the --;

Claim 3, column 12, line 15, delete "nay" and substitute therefor -- any --;

Claim 3, column 12, line 17, delete "responsive" and substitute therefor -- response --;

Claim 13, column 13, line 13, after "seat" insert -- as a function of said control signal with --; and Claim 16, column 13, line 28, after "fluid" insert -- control --.

Signed and Sealed this

Seventh Day of September, 1993

*Attest:*

BRUCE LEHMAN

*Attesting Officer*    *Commissioner of Patents and Trademarks*